Figure 1:
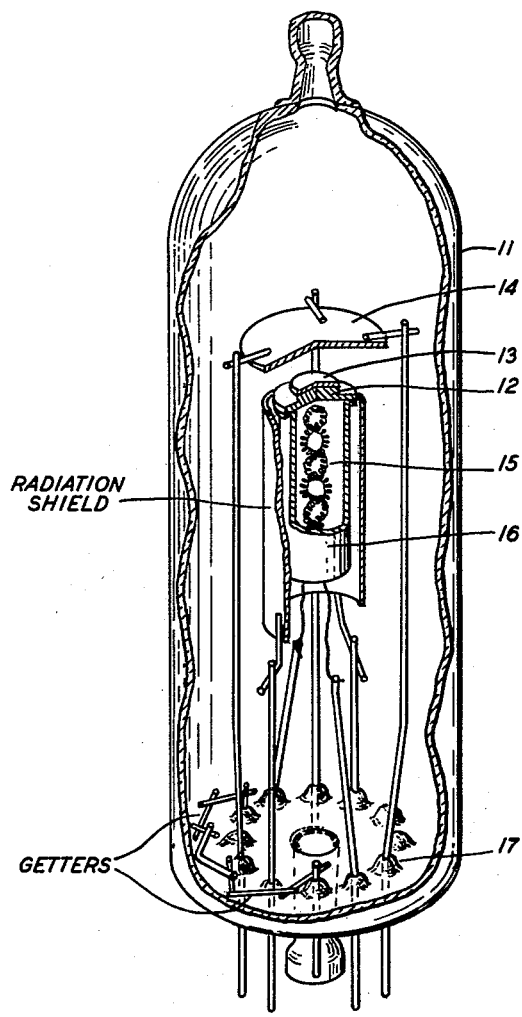

June 1, 1965    D. MacNAIR    3,186,786
METHOD FOR PROCESSING OXIDE COATED CATHODES
Filed June 1, 1961    2 Sheets-Sheet 1

INVENTOR
D. MacNAIR
BY
ATTORNEY

United States Patent Office 3,186,786
Patented June 1, 1965

3,186,786
METHOD FOR PROCESSING OXIDE
COATED CATHODES
Donald MacNair, Berkeley Heights, N.J., assignor to
Bell Telephone Laboratories, Incorporated, New York,
N.Y., a corporation of New York
Filed June 1, 1961, Ser. No. 114,256
12 Claims. (Cl. 316—17)

This invention relates to a method for processing oxide-coated cathodes.

The most conventional type of cathode structure in commercial use at this time is known as the "coated" cathode and typically consists of a nickel base having a coating of an alkaline earth metal oxide, generally including barium oxide.

At an early stage in the development of the oxide cathode it was determined that a binder was necessary to enable the various emissive coatings to adhere to the cathode base. This need was first satisfied by mixing a paraffin with alkaline earth carbonates utilized as the emissive coatings and was generally applied by brush or by passing the heated cathode across a paraffin stick. Others found it was more desirable to use alkaline earth nitrates as the binder. All of these early binders were usually removed by heating the coated cathode in air or a carbon dioxide atmosphere at temperatures within the range of 600 to 1000° C. As a result of the high temperatures employed, it was common for a thick oxide film to develop at the interface of the coating and the base, so tending to lower the electron emission levels of the cathode.

In the early twenties intensive investigation of cathode properties led to the use of cellulose nitrate solutions as binders. Initially, such solutions were applied by dipping the coated cathode into the nitrate solution and later by spraying. More recently, the spray combination as we know it today was developed wherein a mixture of carbonates, nitro-cellulose and amyl acetate are sprayed upon the cathode simultaneously.

Following the coating step, the sprayed oxide cathode is processed by converting the carbonates to the corresponding oxides in a vacuum at temperatures ranging from 850 to 1100° C. An alternative procedure for such conversion is described by D. MacNair in copending application, Serial No. 16,559, filed March 21, 1960, now U.S. Patent No. 3,004,816, and consists of heating the cathode in the presence of hydrogen at temperatures within the range of 750 to 1000° C.

During the conversion reaction in the foregoing techniques, the nitro-cellulose binder begins to decompose at temperatures ranging from 100 to 150° C., so evolving noxious vapors which generally are not completely removed until the temperature approximates 400° C. However, there remains a carbon residue upon the carbonate coating, which is subsequently removed by reaction with carbon dioxide liberated during conversion of the carbonates to the oxides.

During the course of this conversion and before decomposing the binder begins to melt, generally, within the temperature range of 60 to 120° C., so developing a vapor pressure of the order of several hundred millimeters and causing the deposition of carbonaceous substances upon adjacent electrodes and enclosures. As the temperature increases the organic materials already formed tend to decompose and liberate nitric and nitrous oxides which, in turn, may react with the cathode base or adjacent electrodes. The resultant deposited evaporants in the form of either reaction products or films when subsequently electron bombarded may liberate gases which in turn react with the cathode, so causing initial deactivation and deactivation throughout life.

In accordance with the present invention, coated oxide cathodes which contain the alkaline earth carbonates are processed prior to assembly by heating the coated cathode and binder at elevated temperatures in an oxygen-containing ambient. The cathode may subsequently be subjected to firing at elevated temperatures in an atmosphere consisting essentially of hydrogen. The utilization of this technique has been found to eliminate the nitro-cellulose binder prior to assembly without depositing residual organic materials upon the cathode, base, coating, or adjacent electrodes while still retaining its beneficial attributes and decreasing the time period for activation of the cathode as well as increasing emission levels.

Figure 2:
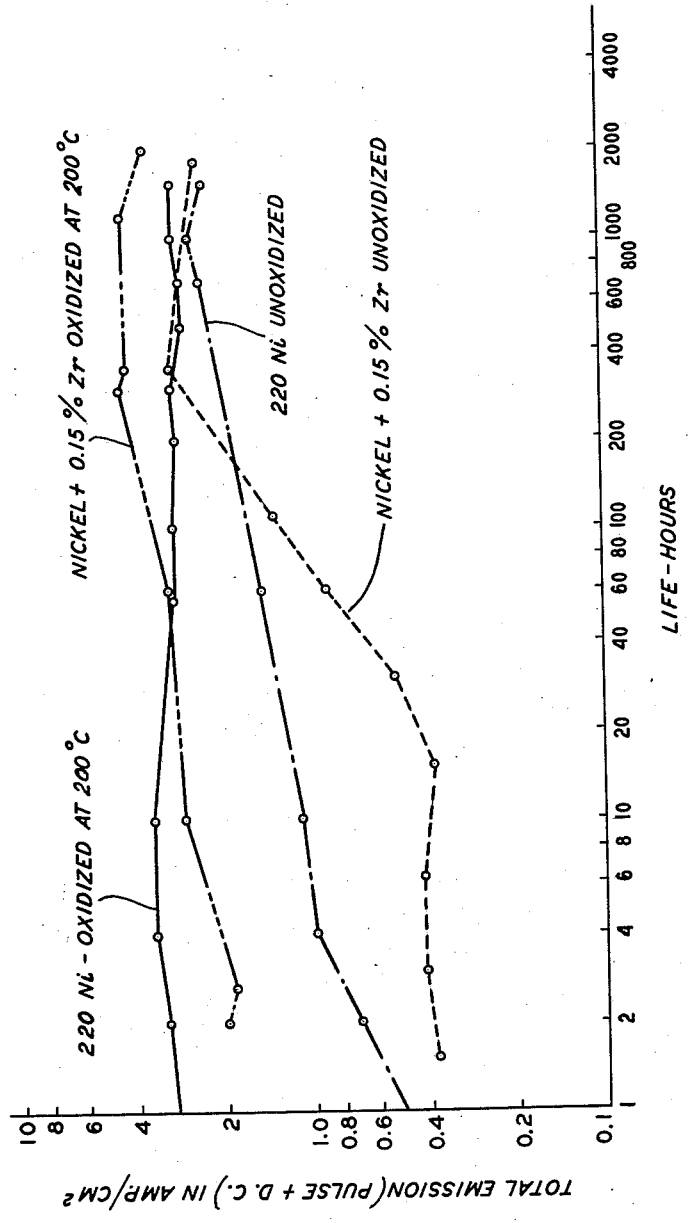

The invention will be more fully understood and other aspects will become apparent from the description of the invention, which will be made with reference to the accompanying drawing, forming a part of the specification, and wherein:

FIG. 1 is a perspective view, partly in section, of a diode structure processed in accordance with the invention, and FIG. 2 on logarithmic coordinates is a graphical representation of total emission in amperes per square centimeter against time in hours, showing the life data for coated oxide cathodes processed in accordance with conventional procedures as compared with those in which the binder has been oxidized in accordance with the present invention.

A general outline of a method suitable for use in the manufacture of a thermionic tube in accordance with the method of this invention is set forth below. Certain operating parameters and ranges as well as the type of materials employed are indicated.

Any of the powdered emitting mixtures well known in the preparation of coated oxide cathodes may be employed. These materials contain a barium compound which will break down on a vacuum station to yield barium oxide. In general this compound is a carbonate. Such materials include the single carbonate material, barium carbonate; the double carbonate material, coprecipitated barium-strontium carbonate; and the triple carbonate material, coprecipitated barium-strontium-calcium carbonate. In general, it has been found that the double carbonate is to be preferred over the single and that little further advantage is gained by use of the triple carbonate. The double carbonate most commonly available for this purpose is a coprecipitant of equimolar portions of barium carbonate and strontium carbonate.

In addition to the carbonates listed above there is added a binder to the emitting mixture. The binder material may be nitro-cellulose or any suitable material well known to those skilled in the cathode art such as isobutylmethacrylate, acetone solutions of stearic acid, et cetera. Binders are added to the mixture in minimum quantities (2–4% by weight of total mixture) to assure maximum density.

Referring again to the figures, FIG. 1 shows a diode structure containing a cathode processed in accordance with the present inventive technique. Such structure includes outer envelope 11, containing cathode element 12 which is disk-shaped of an outside diameter of approximately 200 mils, having a thickness of approximately 50 mils and having an emissive surface 13 which is disk-shaped, of a diameter of 100 mils and is 25 mils distant from anode element 14. The cathode is heated by a heater element 15, said heater element being enclosed within tube 16. Paired electrical leads make connection with heater 15, cathode 12, and anode 14, respectively, and pass through glass base 17 which is hermetically sealed with envelope 11.

A general description of a typical coating process incorporating the inventive procedure is set forth below:

A cathode base is prepared in the normal fashion utilizing, for example, 220 nickel (low silicon, low magnesium-nickel alloy) or a nickel-zirconium alloy comprising 0.1 percent zirconium as the base material. The base is degreased in a solution of trichloroethylene and is ultrasonically cleaned. Next, the degreased base is washed and ultrasonically cleaned in distilled or deionized water. Finally, the base is air dried.

Next, following the cleaning treatment, the base is placed in a hydrogen oven and heated to a temperature of the order of 1000° C. for 15 minutes. At the expiration of the designated time period the heating ceases and the base is permitted to cool to room temperature and is removed from the oven.

The next stage in the fabrication of the coated cathode comprises coating the base, by spraying, painting or dipping, with a mixture of at least one alkaline earth carbonate, and a binder such as amyl acetate and 2–4 percent by weight of nitro-cellulose binder.

The coated cathode is then heated in air or oxygen at a temperature within the range of 200 to 300° C. for a time period of the order of 5 to 15 minutes, so eliminating the binder. It has been determined that heating the cathode at temperatures appreciably below 200° C. fails to eliminate the binder whereas temperatures in excess of 300° C. have no added effect, the binder having been completely oxidized before the temperature attains such heights.

The cathode is next mounted in a tube or tester and processed in the conventional manner, for example, vacuum conversion or hydrogen reduction.

In brief, a typical conversion procedure consists of sealing the element on a vacuum station and evacuating to a pressure of the order of $10^{-8}$ millimeters of mercury. The cathode is then heated to about 400° C. for the purpose of eliminating occluded gases. Then the cathode is heated to a temperature of the order of 950° C. until the carbonates are converted to the corresponding oxides. This heating procedure, which may take of the order of 5 to 10 minutes for an emitting layer thickness of approximately 1 to 4 mils, is terminated when substantially all of the carbonates are broken down. The breakdown point is indicated by a sudden drop in pressure within the chamber. The cathode is then heated to about 1000° C. and is held at this temperature for about 5 minutes after which the temperature of the structure is dropped to about 850° C. where the total current is then measured by direct current or pulse measurement.

As an alternative to the process described above, it may be desirable to reduce any oxidized nickel which might have formed during the oxidation of the cathode in the binder removal step. The reduction may be facilitated by heating the cathode to a temperature within the range of 500 to 550° C. for a time period within the range of 10 to 20 minutes, so assuring complete reduction of the nickel oxide to nickel. The carbonate coating is not affected by either the oxidation or reduction stages of the process and is only converted when subjected to the high temperature vacuum conversion or hydrogen reduction technique described in the copending application of D. MacNair, alluded to above.

In order that those skilled in the art may more fully understand the inventive concept herein presented, the following examples are given by way of illustration and not limitation.

EXAMPLE I

Four 220 nickel sheets 2″ x 1½″ x .005″ were coated, two with double carbontes containing 2 percent by weight binder (amyl acetate and nitro-cellulose) and two with triple carbonate containing 5 percent by weight binder (amyl acetate and nitro-cellulose). The double carbonates gave a coating density of about 1 gram per cubic centimeter and the triple carbonate 2 grams per cubic centimeter. After coating and a preliminary drying at 45° C. for 5 minutes, to insure amyl acetate evaporation, the sheets were weighed and heated in oxygen at 200° C. for 10 minutes, and the percentage loss in coating weight determined. Then the sheets were refired at 300° C. for 10 minutes in oxygen and reweighed. As a control, 4 nickel sheets were subjected to the same treatment, two containing a coating of 2 percent binder (amyl acetate and nitro-cellulose) and two containing no coating. The results are set forth in Table I below.

*Table I*

| Nickel Sheet | Type of Coating | Coating Weight (gm.)[1] | Weight Loss After— 200° C. 10 min. in $O_2$ | Weight Loss After— 300° C. 10 min. in $O_2$ | Percentage Loss in Coating Weight After 200° C. $O_2$ Treatment |
|---|---|---|---|---|---|
| 1 | Binder only | 0.0029 | 0.0031 | 0.0001 | 100 |
| 2 | ----do---- | 0.0025 | 0.0026 | 0.0000 | 100 |
| 3 | Double Carbonate. | 0.1086 | 0.0025 | −0.0001 | 2.3 |
| 4 | ----do---- | 0.0548 | 0.0011 | +0.0002 | 2.0 |
| 5 | Triple Carbonate. | 0.0306 | 0.0016 | +0.0003 | 5.2 |
| 6 | ----do---- | 0.0333 | 0.0017 | +0.0002 | 5.1 |
| 7 | Uncoated | 0 | 0.0001 | 0.0000 | 0 |
| 8 | ----do---- | 0 | 0.0001 | −0.0001 | 0 |

[1] All weights ± 0.001 gram.

From the results of these tests it was indicated that a 200° C. oxygen treatment was sufficient to substantially eliminate the binder. Sheets 1 and 2 in which a binder but no coating was employed indicated that total composition occurs after heating in oxygen for 10 minutes at 200° C. Employing a double carbonate coating containing approximately 2 percent binder or a triple carbonate coating and five percent binder indicates similar results as is shown by sheets 3–6. Heating an uncoated nickel sheet at the indicated temperatures results in substantially no weight changes, so indicating that binder decomposition occurs almost entirely at 200° C.

EXAMPLE II

Four cathodes were prepared, two utilizing a 220 nickel base and two a base comprising an alloy of nickel and 0.15 percent zirconium. Each base was coated with a high density type carbonate coating .0005″ thick and 0.050″ in diameter. One coated cathode from each group was heated in an oxygen ambient at 200° C. for 5 minutes, the remaining two cathodes were assembled as sprayed. Cathode to anode spacing was 0.025″ and all testers were evacuated to $10^{-7}$ millimeters and baked at 400° C. for 4 hours. After bakeout the cathodes were heated to 950° C. in 5 minutes and held at this temperature for 5 minutes with the anode R.F. heated so as to maintain a temperature of 900° C. throughout the breakdown period.

FIG. 2 on logarithmic coordinates is a graphical representation of total emissions in amperes per square centimeter against time in hours and shows the life data for the 0.050″ diameter cathode coatings on 220 nickel and nickel–0.15 percent zirconium alloy prepared in accordance with Example II. The data was compared by contrasting the life data of the cathodes in which the binder was eliminated against those processed by conventional techniques. Total emission is plotted against time and is measured by applying a 400 volt, $6\mu$ second square wave pulse with a repetition rate of one pulse per second. The pulse is superimposed directly over the steady state direct current operating conditions. The results obtained as evidenced by the curves of FIG. 2 clearly demonstrate that the cathodes which were oxidized to remove the binder prior to assembling and conversion of the carbonates show significantly better total emission characteristics than cathodes which are unoxidized. It is also seen that a given emission level is more rapidly attained by processing in accordance with the present invention. Conversion of the carbonates to the corresponding oxides by hydrogen reduction techniques shows results similar to those obtained above.

Further experimentation has revealed that reducing the anode to cathode spacing from 0.025" to 0.005" in a diode which has been treated in accordance with the present invention permits activation of the diode within 10 to 50 hours whereas normal activation using an unoxidized cathode tube is of the order of 200 hours.

A still further advantage of the present invention is to be gained when operating in a system which employs ion pumps. Recently the use of such devices for pumping tubes has become quite popular and the presence of organic materials in the tubes being pumped has the effect of contaminating the pump. Elimination of the binder by the present technique substantially avoids deposition of organic materials on the tube surfaces.

It will be understood by those skilled in the art that the thickness of the cathode coating may vary from .0005" to .004". The .0005" coating is generally a high density coating (1.5 grams per cubic centimeter), the actual weight of which is about 2.5 milligrams per square centimeter. The .001" to .002" coatings are of low density (0.5 to 0.9 gram per cubic centimeter) and the actual weight is of the order of 5.0 milligrams per square centimeter.

While the invention has been described in detail in the foregoing description and drawing, the aforesaid is by way of illustration only and is not restrictive in character. The several modifications which will readily suggest themselves to persons skilled in the art, are all considered within the broad scope of the invention, reference being had to the appended claims.

What is claimed is:

1. A method for processing a cathode including a base, binder and emissive coating comprising at least one alkaline earth carbonate, said cathode being destined for use in a thermionic tube, which comprises the steps of successively heating the said cathode at a temperature within the range of 200 to 300° C. in an oxygen-containing atmosphere, whereby the binder is decomposed and eliminated, assembling the said cathode in a tube envelope and converting the said alkaline earth carbonate to the corresponding oxide.

2. The method in accordance with the the procedure of claim 1 wherein said alkaline earth carbonate consists essentially of barium oxide.

3. The method in accordance with the procedure of claim 1 wherein said alkaline earth carbonate consists essentially of barium-strontium carbonate.

4. The method in accordance with the procedure of claim 1 wherein said alkaline earth carbonate consists essentially of barium-strontium-calcium carbonate.

5. The method in accordance with the procedure of claim 1 wherein said binder consists essentially of nitrocellulose and amyl acetate.

6. The method in accordance with the procedure of claim 1 wherein said base is a 220 nickel.

7. The method in accordance with the procedure of claim 1 wherein said base is an alloy of nickel and zirconium.

8. The method in accordance with the procedure of claim 1 wherein said cathode is heated for a time period within the range of 5 to 15 minutes.

9. The method in accordance with the procedure of claim 1 wherein said heating is conducted at approximately 200° for 10 minutes.

10. The method in accordance with the procedure of claim 1 wherein said alkaline earth carbonate is converted to the corresponding oxide by a vacuum conversion technique.

11. The method in accordance with the procedure of claim 1 wherein said alkaline earth carbonate is converted to the corresponding oxide by a hydrogen reduction technique.

12. A method for processing a cathode including a base, binder and emissive coating comprising at least one alkaline earth carbonate, said cathode being destined for use in a thermionic tube which comprises the steps of successively heating the said cathode at a temperature within the range of 200 to 300° C. in an oxygen-containing atmosphere whereby the binder is decomposed and eliminated, heating the said cathode in a hydrogen ambient at a temperature within the range of 500 to 550° C., thereby reducing any base material which oxidized during the binder decomposition step, assembling the said cathode in a tube envelope and converting the said alkaline earth carbonate to the corresponding oxide.

References Cited by the Examiner

UNITED STATES PATENTS

| | | | |
|---|---|---|---|
| 2,041,802 | 5/36 | Wilson et al. | 117—224 |
| 2,275,886 | 3/42 | Bondley et al. | 29—25.14 |
| 2,673,387 | 3/54 | Forker | 29—25.14 |
| 2,912,611 | 11/59 | Beck et al. | 29—25.14 X |

FRANK E. BAILEY, *Primary Examiner.*

LEON PEAR, *Examiner.*